United States Patent
Merritt et al.

(10) Patent No.: US 10,853,256 B2
(45) Date of Patent: Dec. 1, 2020

(54) CACHE OPERATION IN AN APPARATUS SUPPORTING BOTH PHYSICAL AND VIRTUAL ADDRESS MAPPING

(71) Applicant: Arm Limited, Cambridge (GB)

(72) Inventors: Andrew Merritt, Cambridge (GB);
Alex Beharrell, Cambridge (GB);
Saqib Rashid, Cambridge (GB);
Raghavendra Adiga Bandimutt, Cambridge (GB)

(73) Assignee: Arm Limited, Cambridge (GB)

( * ) Notice: Subject to any disclaimer, the term of this patent is extended or adjusted under 35 U.S.C. 154(b) by 15 days.

(21) Appl. No.: 16/239,646

(22) Filed: Jan. 4, 2019

(65) Prior Publication Data
US 2020/0218660 A1   Jul. 9, 2020

(51) Int. Cl.
*G06F 12/1045* (2016.01)
*G06F 12/0871* (2016.01)

(52) U.S. Cl.
CPC ...... *G06F 12/0871* (2013.01); *G06F 12/1054* (2013.01); *G06F 12/1063* (2013.01)

(58) Field of Classification Search
None
See application file for complete search history.

(56) References Cited

U.S. PATENT DOCUMENTS

| | | | | |
|---|---|---|---|---|
| 6,009,503 A * | 12/1999 | Liedtke | | G06F 12/1054 711/200 |
| 6,079,003 A * | 6/2000 | Witt | | G06F 9/30152 711/200 |
| 6,226,730 B1 * | 5/2001 | Murdoch | | G06F 12/0215 711/200 |
| 6,477,612 B1 * | 11/2002 | Wang | | G06F 12/1009 711/2 |
| 7,761,665 B2 * | 7/2010 | Grandou | | G06F 12/0895 711/128 |
| 9,336,147 B2 * | 5/2016 | Kotla | | G06F 12/0848 |
| 9,658,963 B2 * | 5/2017 | Morris | | G06F 12/0862 |
| 2013/0238875 A1 * | 9/2013 | Ramaraju | | G06F 12/1027 711/207 |
| 2018/0095886 A1 * | 4/2018 | Kamikubo | | G06F 12/0891 |

\* cited by examiner

*Primary Examiner* — Elias Mamo
(74) *Attorney, Agent, or Firm* — Nixon & Vanderhye P.C.

(57) ABSTRACT

Apparatuses and methods of operating apparatus are disclosed. A processing element performs data processing operations with respect to data items stored in data storage. In a first mode the processing element references the data items using physical addresses and in a second mode the processing element references the data items using virtual addresses. A data access request handling unit receives data access requests issued by the processing element and cache stores cache lines of temporary copies of the data items retrieved from the data storage, wherein a cache line in which a data item is stored in the cache is selected in dependence on an address index portion. The data access request handling unit is responsive to a data access request for the data item from the processing element in the second mode to determine an index matching condition to be true when the address index portion of the physical address of the data item matches the address index portion of the virtual address of the data item and, when the index matching condition is false, to prevent allocation of the data item into the cache.

16 Claims, 6 Drawing Sheets

CACHE OPERATION IN AN APPARATUS SUPPORTING BOTH PHYSICAL AND VIRTUAL ADDRESS MAPPING

TECHNICAL FIELD

The present disclosure relates to data processing. In particular, the present disclosure relates to the operation of a cache in a data processing apparatus supporting both physical and virtual address mapping.

DESCRIPTION

A processing element of a data processing apparatus may be arranged to perform its data processing operations with respect to data items stored in data storage by referencing those data items using physical addresses (i.e. directly corresponding to storage locations of those data items in the data storage) or may be arranged to reference those data items using virtual addresses. An apparatus using virtual addresses is additionally provided with a translation mechanism to translate between virtual addresses used by the processing element and the physical addresses used in the data storage. Address translations between the virtual memory map and the physical memory map can be cached locally to the processing element, but on occasions must be retrieved from the data storage itself and hence there is variability in the latency of the performance of such address translations. Nevertheless the idealised abstraction of the data storage which a virtual memory map provides is useful in various contexts. Furthermore, a processing element may be arranged to be able to switch between two modes of operation, a first in which a physical memory map is used and a second in which the virtual memory map is used. In itself this provides a useful multi-functionality of the processing element. However, when the processing element is provided with a local cache, the caching of both data referenced in the physical memory map (i.e. indexed by physical address indexes) and data referenced by the virtual memory map (i.e. referenced by virtual address indexes) can be the detriment to the operation of the processing element in its physical memory map mode.

SUMMARY

In one example embodiment described herein there is an apparatus comprising: a processing element to perform data processing operations with respect to data items stored in data storage, wherein when in a first mode the processing element is arranged to reference the data items using physical addresses and when in a second mode the processing element is arranged to reference the data items using virtual addresses; a data access request handling unit to receive data access requests issued by the processing element; and a cache to store cache lines of temporary copies of the data items retrieved from the data storage, wherein a cache line in which a data item is stored in the cache is selected in dependence on an address index portion, and wherein the data access request handling unit is responsive to a data access request for the data item from the processing element in the second mode to determine an index matching condition to be true when the address index portion of the physical address of the data item matches the address index portion of the virtual address of the data item and, when the index matching condition is false, to prevent allocation of the data item into the cache.

In one example embodiment described herein there is a method of data processing comprising: performing data processing operations with respect to data items stored in data storage, wherein in a first mode the performing data processing operations references the data items using physical addresses and in a second mode the performing data processing operations references the data items using virtual addresses; receiving data access requests issued as part of performing data processing operations; caching cache lines of temporary copies of the data items retrieved from the data storage, wherein a cache line in which a data item is stored in the cache is selected in dependence on an address index portion; and in response to a data access request for the data item from the performing data processing operations in the second mode: determining an index matching condition to be true when the address index portion of the physical address of the data item matches the address index portion of the virtual address of the data item; and, when the index matching condition is false, preventing allocation of the data item into the cache.

In one example embodiment described herein there is an apparatus comprising: means for performing data processing operations with respect to data items stored in data storage, wherein when in a first mode the means for performing data processing operations is arranged to reference the data items using physical addresses and when in a second mode the means for performing data processing operations is arranged to reference the data items using virtual addresses; means for receiving data access requests issued by the means for performing data processing operations; means for caching cache lines of temporary copies of the data items retrieved from the data storage, wherein a cache line in which a data item is stored in the means for caching cache lines is selected in dependence on an address index portion; and means for determining, in response to a data access request for the data item from the means for performing data processing operations in the second mode, an index matching condition to be true when the address index portion of the physical address of the data item matches the address index portion of the virtual address of the data item; and means for preventing allocation of the data item into the cache when the index matching condition is false.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
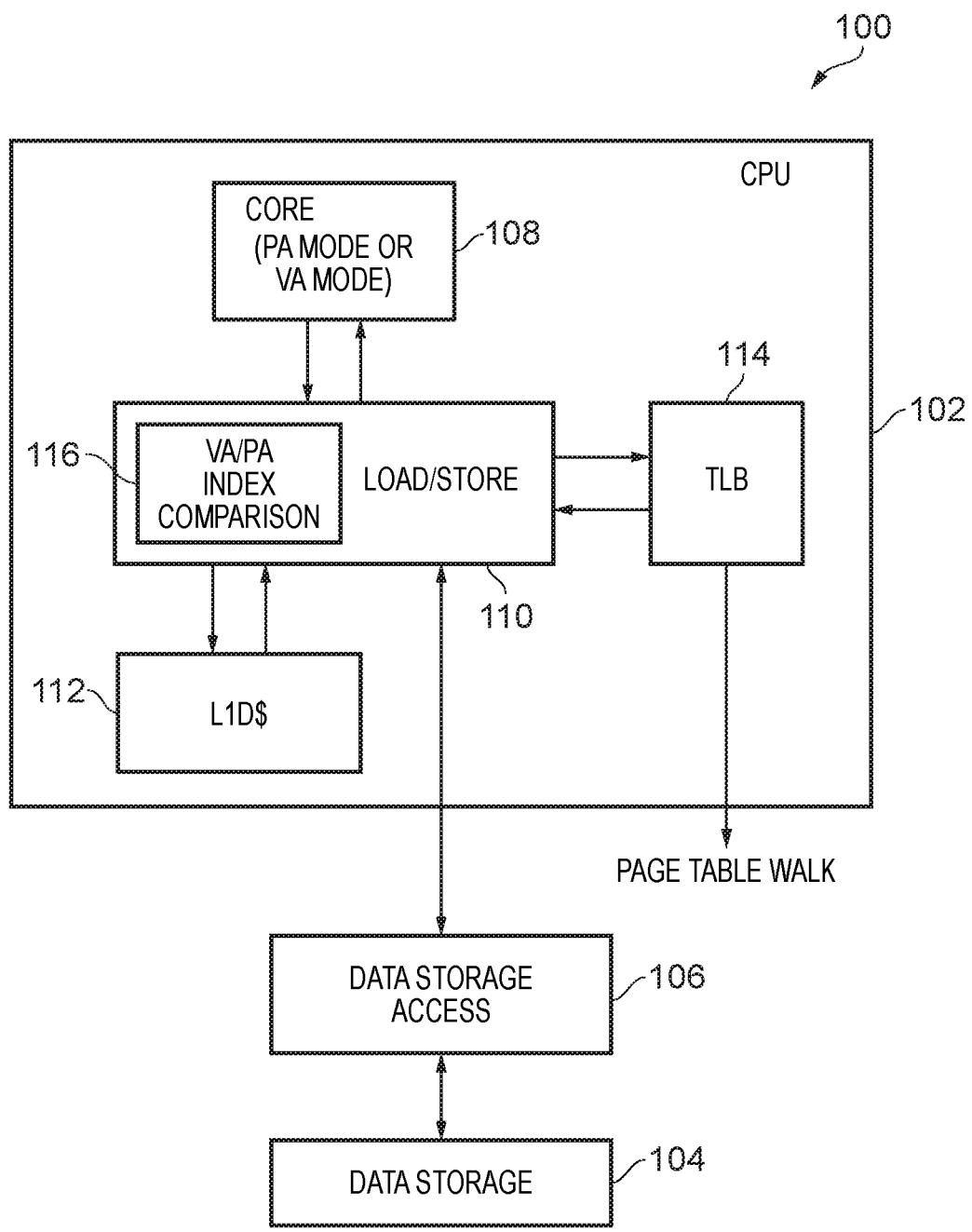
FIG. 1 schematically illustrates an apparatus in one example embodiment.

Before discussing the embodiments with reference to the accompanying figures, the following description of embodiments is provided.

In accordance with one example configuration there is provided an apparatus comprising: a processing element to perform data processing operations with respect to data items stored in data storage, wherein when in a first mode the processing element is arranged to reference the data items using physical addresses and when in a second mode the processing element is arranged to reference the data items using virtual addresses; a data access request handling unit to receive data access requests issued by the processing element; and a cache to store cache lines of temporary copies of the data items retrieved from the data storage, wherein a cache line in which a data item is stored in the cache is selected in dependence on an address index portion, and wherein the data access request handling unit is responsive to a data access request for the data item from the processing element in the second mode to determine an index matching condition to be true when the address index portion of the physical address of the data item matches the address index portion of the virtual address of the data item and, when the index matching condition is false, to prevent allocation of the data item into the cache.

The present techniques recognise, where the apparatus has a cache in which temporary copies of data items may be stored as a result of data processing performed either in the first mode (a physical memory map mode, also referred to herein as physical memory system architecture—PMSA) or in the second mode (a virtual memory map mode, also referred to herein as virtual memory system architecture—VMSA), the fact that operation in the virtual memory map mode may result in aliases due to virtual indexing being created in the cache and that this could be detrimental to performance using physical addresses in the first mode. For example, this could introduce variability into the latency for memory accesses in the first mode. In some operating contexts a deterministic, consistent performance may be desirable.

However, the present techniques recognise that such virtual indexing causes differences in terms of the storage of the relevant data item in the cache only to the extent that an address index portion of a virtual address of a data item differs from an address index portion of the physical address of the data item. Accordingly, the data access request handling unit of the apparatus is arranged to be responsive to a data access request, when the processing element is in the second (virtual memory map) mode to determine whether the address index portion of the virtual address being used in the second mode is the same as the address index portion of the physical address of the data item. When the two differ, i.e. aliasing due to virtual indexing is occurring, then the data access request handling unit prevents allocation of the data item into the cache. Alternatively, when the address index portion of the physical address of the data item is the same as the address index portion of the virtual address of the data item, the data access request handling unit allows allocation of the data item into the cache. This is because, although the data item is being referenced in the second mode using a virtual address, the address index portion of the virtual address is the same as the address index portion of the physical address of the data item, and therefore the data item is held in the same location (i.e. cache line) as in the physical mode. This approach ensures that the processing element can either operate in the first (physical) or the second (virtual) mode, without negative impact of the operation in the second (virtual) mode on the performance in the first (physical) mode. This further helps to support the low variability and therefore reliability, of the performance in the first (physical) mode.

Moreover, the present techniques recognise that the address index portions of a physical address and a virtual address of a data item may be constrained to differ from each other, by at most, an address index sub-portion. For example, depending on the relative size of the address index portion, an offset portion, and the minimum page table size being used to translate between physical and virtual addresses, there may be a limit on how much of the address index portion can in fact differ between a virtual address and a physical address. Accordingly, in some embodiments the address index portion of the physical address of the data item differs from the address index portion of the virtual address of the data item by at most an address index sub-portion, and wherein the data access request handling unit is responsive to the data load request for the data item from the processing element in the second mode to determine the index matching condition to be true when the address index sub-portion of the physical address of the data item matches the address index sub-portion of the virtual address of the data item. To give just one example, in a cache having cache lines of 512 bits, corresponding to an offset using bits [5:0], and a cache of size 64 kB, the cache lines may be indexed by bits [13:6] of the address. Accordingly, in a memory map using a smallest page size of 4 kB, this corresponds to bits [11:0] of the address (and therefore bits [11:0] are the same for the physical and the virtual address) and thus only bits [13:12] of an address can differ between virtual and physical addresses. Thus an efficient comparison between virtual and physical address index portions may be implemented by performing only a two-bit comparison in this example.

Nevertheless, when a data access request is received in which the index matching condition is true, that is to say the address index portion (or sub-portion) of the addresses are the same then the virtual address mode will cause the data item to be cached in the same location as it would be by the physical address mode and accordingly this will not be disruptive to the operation of the physical address mode. Hence, in some embodiments the data access request handling unit is responsive to the index matching condition being true, to cause allocation of the data item into the cache.

In order for the data access request handling unit to determine if the index matching condition is true, it is required for the received virtual address to be translated into its corresponding physical address. However, the present techniques further recognise that processing efficiency for handling these data access requests may be gained by already carrying out a speculative lookup in the cache using the virtual address index portion of the data item. According to the present techniques, the data item will only be found in the cache if the index matching condition is true and therefore the virtual address index portion is the same as the physical address index portion, as well as the data item currently being present in the cache. Thus, looked at the other way round, if a cache miss results from this speculative look up, this can either be because the data item is not present in the cache (but the address index matching condition is true) or because the address index matching condition is not true.

Accordingly, whilst it would be possible to simply perform the speculative lookup in the cache using the virtual address index portion of the data item, in some embodiments the data access request handling unit is responsive to the data load request for the data item from the processing element in the second mode to translate the virtual address of the data item into the physical address of the data item in parallel with the speculative lookup in the cache. Accordingly, the translation of the virtual address of the data item into the physical address allows a determination to be made of whether a miss resulting from the speculative lookup in the cache was because the virtual address and the physical address differ in their address index portions, in which case the data item should not be allocated into the cache, or whether the two address index portions match, and to support further performance the data item can be allocated into the cache without negative effect on the performance (e.g. memory access latency variation) in the physical addressing mode.

In some embodiments when the data access request is a data write request the data access request handling unit is responsive to the data write request for the data item from the processing element in the second mode to determine whether the index matching condition is true, and, when the index matching condition is false, to prevent allocation of the data item into the cache and to cause invalidation of a cache line identified by the address index portion of the physical address of the data item. This approach provides that the data write request will cause the data to be written out to the data storage, but also that an invalidating action is carried out with respect to the location in which the virtual and physical address index portions are the same. This approach ensures that the processing element operating in the second (virtual mapping) addressing mode can access the data storage from any valid virtual address mapping, but the cache will only ever contain data for which the virtual and physical address index portions are the same, thus ensuring that when the processing element operates in the first (physical mapping) mode this can be done without any dependencies on evicting or updating aliased locations in the cache.

As described above, the present techniques may be applied to the access to data storage where physical addressing and virtual addressing modes are used and when there is a single shared cache for both modes which can improve the performance of the apparatus in the physically mapped addressing mode. The data storage accessed may be the same in both the first and the second mode. However, in some embodiments the data storage comprises a first data storage and a second data storage, and the processing element is arranged to access the data items in the first data storage using the first mode and to access the data items in the second data storage using the second mode. Accordingly, the first data storage can be dedicated to the use of the first (physical mapping) mode and therefore protected in particular by the present techniques.

In embodiments in which first and second data storage is provided these respective data storage instances may take a variety of forms, but in some embodiments the first data storage has a lower average access latency than the second data storage. Accordingly, the access to the lower average access latency data storage can thus be protected by the present techniques and therefore that lower average access latency can be better preserved.

In some embodiments the data access request handling unit is responsive to the data access request with respect to the first data storage to treat the cache as a write-through cache and is responsive to the data access request with respect to the second data storage to treat the cache as a write-back cache. Treating the first data storage as a write-through cache further improves the limited variability in the latency of access to this data storage thus improving the reliability of the system when operating using the processing element in its first (physical mapping) mode.

In some embodiments the apparatus comprises multiple processing elements to perform the data processing operations with respect to the data items stored in the data storage, wherein the data access request handling unit is arranged to receive data access requests issued by each of the multiple processing elements.

In some embodiments the data access request handling unit is responsive to the data access request for the data item from the processing element in the second mode to issue coherency protocol commands with respect to the data item to each of the multiple processing elements.

In some embodiments the data access request handling unit is responsive to the data write request for the data item, when the index matching condition is true, to cause allocation of the data item into the cache.

In some embodiments the data access request handling unit is responsive to the data write request for the data item, when causing allocation of the data item into the cache, to forward a data read request for a cache line containing the data item to the data storage and, when the cache line is returned, to cause the data item to be merged into the returned cache line and to form an updated returned cache line and to cause allocation of the updated returned cache data item into the cache.

In some embodiments the processing element is arranged to operate in the first mode when performing data processing operations for a real-time context and to operate in the second mode when performing data processing operations for a non-real-time context. Here a real-time context may for example be one in which a low latency for memory accesses is required and in which that latency must have low variability. By contrast a non-real-time context may therefore be one in which the latency for memory accesses is less critical, and this latency can be allowed to be greater and/or to vary.

In accordance with one example configuration there is provided a method of data processing comprising: performing data processing operations with respect to data items stored in data storage, wherein in a first mode the performing data processing operations references the data items using physical addresses and in a second mode the performing data processing operations references the data items using virtual addresses; receiving data access requests issued as part of performing data processing operations; caching cache lines of temporary copies of the data items retrieved from the data storage, wherein a cache line in which a data item is stored in the cache is selected in dependence on an address index portion; and in response to a data access request for the data item from the performing data processing operations in the second mode: determining an index matching condition to be true when the address index portion of the physical address of the data item matches the address index portion of the virtual address of the data item; and, when the index matching condition is false, preventing allocation of the data item into the cache.

In accordance with one example configuration there is provided an apparatus comprising: means for performing data processing operations with respect to data items stored in data storage, wherein when in a first mode the means for performing data processing operations is arranged to reference the data items using physical addresses and when in a second mode the means for performing data processing operations is arranged to reference the data items using virtual addresses; means for receiving data access requests issued by the means for performing data processing operations; means for caching cache lines of temporary copies of the data items retrieved from the data storage, wherein a cache line in which a data item is stored in the means for caching cache lines is selected in dependence on an address index portion; and means for determining, in response to a data access request for the data item from the means for performing data processing operations in the second mode, an index matching condition to be true when the address index portion of the physical address of the data item matches the address index portion of the virtual address of the data item; and means for preventing allocation of the data item into the cache when the index matching condition is false.

Particular embodiments will now be described with reference to the figures.

FIG. 1 illustrates a data processing apparatus 100 in accordance with one embodiment. The apparatus comprises a CPU 102 which accesses data items stored in a data storage 104 via data storage access circuitry 106. Data processing within the CPU 102 is carried by the core 108, which accesses data items via the load/store unit 110. The CPU 102 further comprises a level one data cache (L1D$) 112 in which temporary copies of data items retrieved from the data storage 104 may be stored. The core 108 is arranged to perform its data processing operations referencing the data items either in a physical memory map mode or in a virtual memory map mode. The physical memory map mode may also be referred to herein as a physical memory system architecture (PMSA) and the virtual memory map mode may also be referred to herein as a virtual memory system architecture (VMSA). When the core 108 is operating in its virtual addressing mode, virtual addresses which it passes to the load/store unit 110 must be translated into physical addresses before being passed out to the data storage access circuitry 106 in order to access data items stored in the data storage 104. These translations are cached in a translation lookaside buffer (TLB) 114 and when a required translation is not currently cached in the TLB 114 a page table walk process is carried out. The load/store unit 110 further comprises virtual index/physical index comparison circuitry 116. When the core 108 is operating in its virtual addressing mode and issues a data access request relating to a data item stored in the data storage 104, the VA/PA index comparison circuitry 116 compares the index portion of the virtual address received from the core 108 and the index portion of the corresponding physical address received from the TLB 114. When the two do not match, the load/store unit 110 prevents the data item from being cached in the L1D$ 112. Specifically, the load/store unit 110 prevents allocation of a cache line containing the data item into the L1D$ 112.

Figure 2:
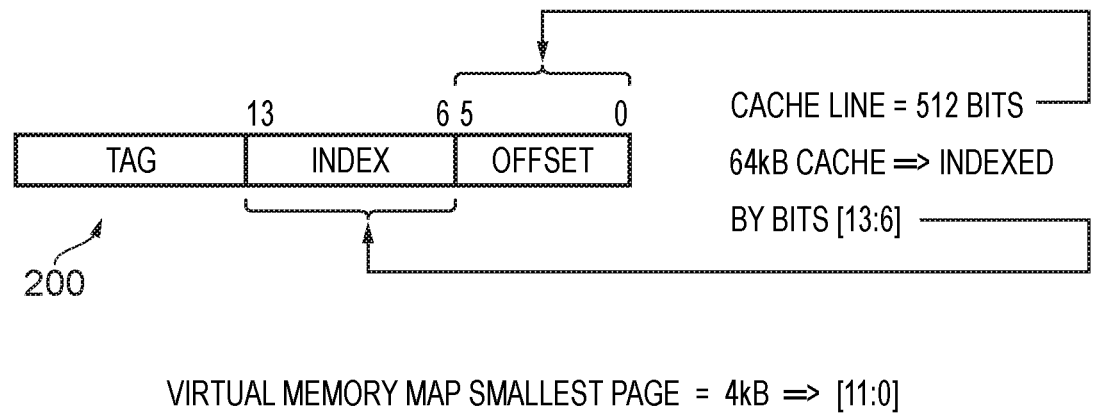
FIG. 2 illustrates the structure of a virtual address and a physical address in one example embodiment, indicating the possible index difference between the virtual address and the physical address.
Figure 2:
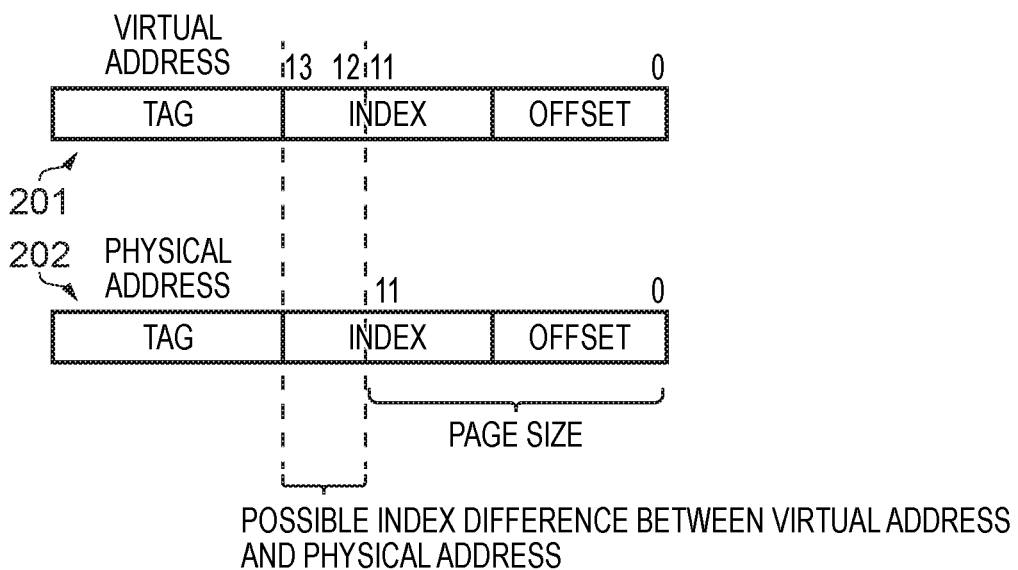

FIG. 2 shows the structure of an address 200 as used in connection with a cache such as the L1D$ 112 discussed with reference to FIG. 1. The address comprises three portions, namely a tag portion, an index portion, and an offset portion. In the illustrated example cache lines are each 512 bits and therefore the offset comprises bits [5:0] of the address. Further, in the illustrated example, a 64 kB cache is considered which is thus indexed by bits [13:6] of the address. In the example of FIG. 2 it is further contemplated that in the translations between physical and virtual memory addresses a virtual memory map is used of which the smallest page size is 4 kB, this corresponding to bits [11:0] of the address (which bits are thus identical for any given pair of physical and virtual addresses). Then considering a corresponding pair of a virtual address 201 and a physical address 202 as shown in the lower half of FIG. 2, it can be seen that in fact the only possible difference between the virtual address and the physical address in terms of their indexing is represented by bits [13:12] of the addresses. Accordingly, in the example of the VA/PA index comparison circuitry 116 in the load/store unit 110 of FIG. 1, only these two bits need to be compared to determine if the virtual and physical address index portions differ from one another. Alternatively put, the fact that a virtual address can only differ from its corresponding physical address by at most two bits of the index portion of the address indicates that there are four possible storage locations (cache lines) for a given data item referenced by a virtual address in the cache. However, the approach of the present techniques, namely to prevent some virtual address indexes from being allocated into the cache on the basis of a comparison of the index portions of the virtual and physical addresses, means that whether the data item is referenced by its virtual address (i.e. the requester is in a virtual memory map mode) or is referenced by its physical address (i.e. the requester is in a physical memory map mode), only the one possible index location defined by the physical address may be used for caching the data item in the cache.

Figure 3:
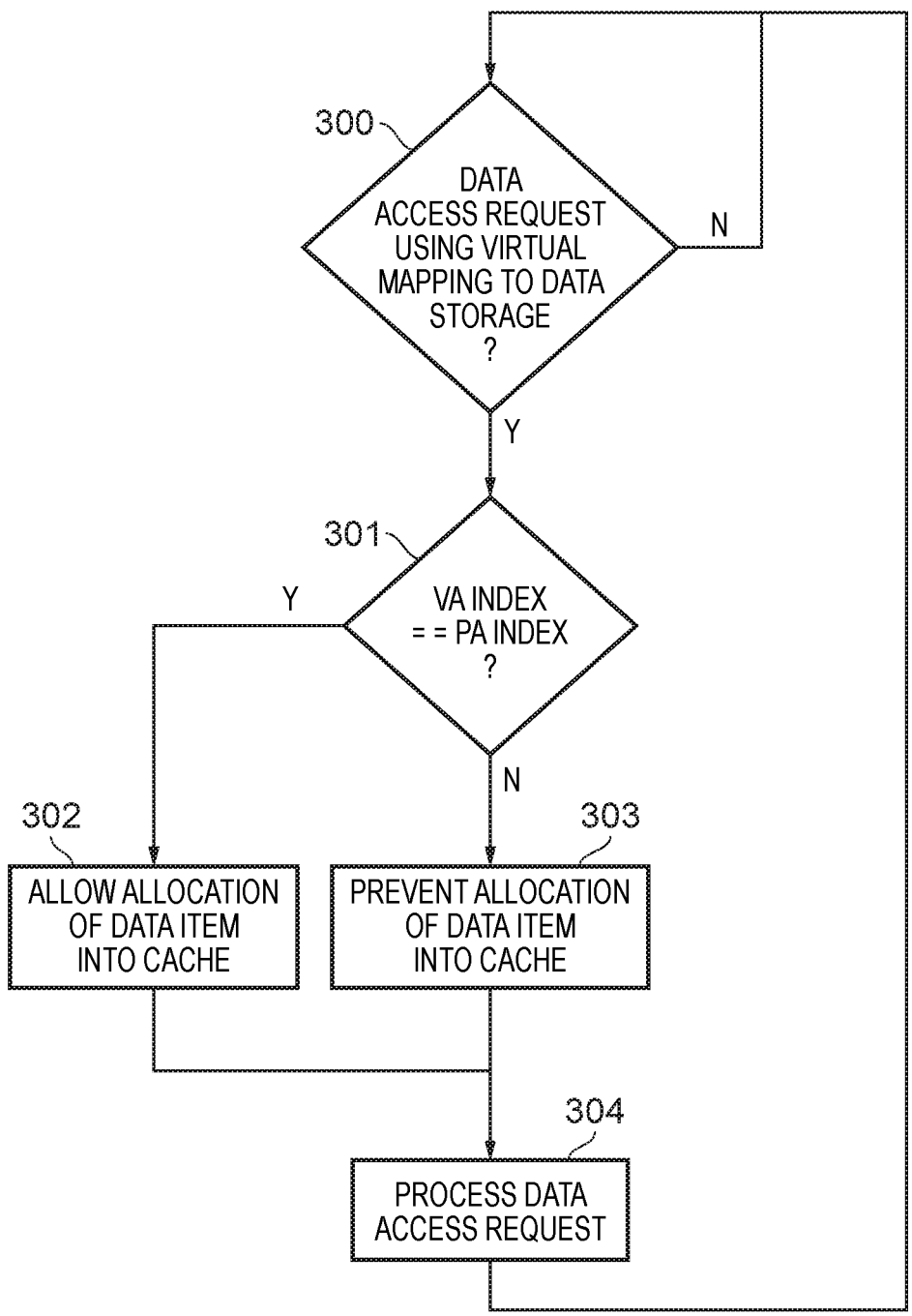
FIG. 3 is a flow diagram showing a sequence of steps which are taken according to the method of one example embodiment.

FIG. 3 is a flow diagram showing a sequence of steps which are taken according to the method of an example embodiment. The flow can be considered to begin at step 300 where it is determined if there is a pending data access request using a virtual mapping to the data storage. Until it is true, the flow waits at this step.

When this is the case at step 301 it is determined if the address index portion of the virtual address is the same as the address index portion of the corresponding physical address. If this is the case then the flow proceeds to step 302 and allocation of the data item (typically as part of a cache line) into the cache is allowed. Conversely, if at step 301 it is determined that this is not the case then the flow proceeds via step 303 where allocation of the data item (typically as part of a cache line) into the cache is prevented. Thereafter, by either route, the flow continues via step 304 where the data access request is processed as required. For example, in the case of a data read request the required data item may be retrieved from the data storage. Alternatively, in the example of a data write request the corresponding data item may be modified and stored into the data storage. Finally, the flow returns to step 300.

Figure 4:
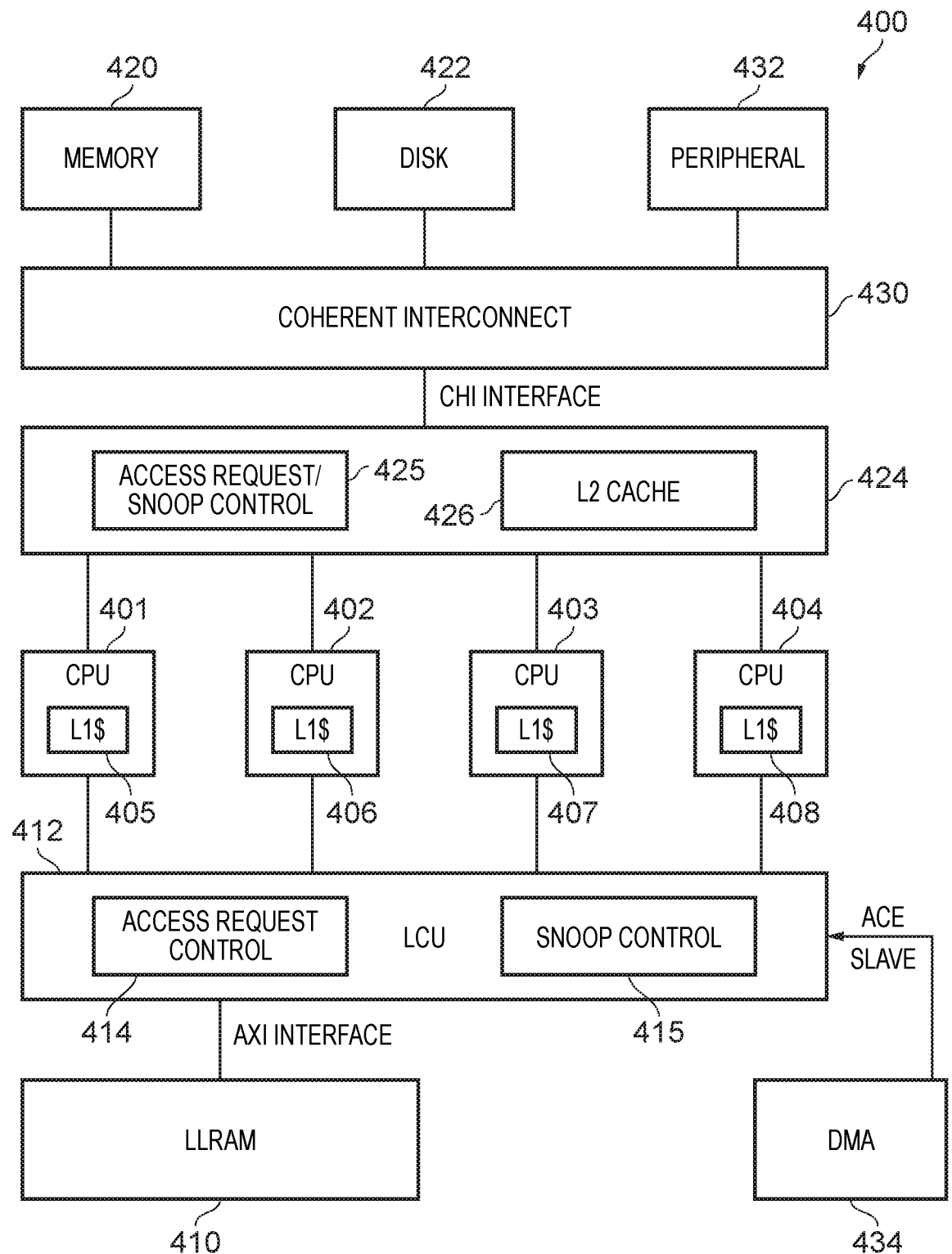
FIG. 4 schematically illustrates a system comprising multiple processing elements each of which have access to two memory systems in one example embodiment.

FIG. 4 schematically illustrates a data processing apparatus 400 in an example embodiment. In this system there are four processing elements, namely the CPUs 401-404. Each CPU is provided with its own local L1 data cache 405-408. In performing their respective data processing operations, the CPUs 401-404 access data items stored in various storage locations in the apparatus 400. One provided data storage is the low-latency RAM (LLRAM) 410 which the CPUs access via the LCU 412 (LCU=LLRAM coherency unit). Access to the LLRAM 410 via the LCU 412 is generally controlled by the access request control circuitry 414 of the LCU 412. The LCU 412 also comprises snoop control circuitry 415, which administers a defined coherency protocol for the apparatus, to ensure consistency of data items copied from data storage into temporary storage locations such as the L1 data caches 405-408. Accordingly the snoop control circuitry 415 will issue various snoops depending on the particular coherency protocol being used. The CPUs 401-404 also have access to other data storage, such as the memory 420 and the disk 422. Access to these components is made via the level two circuitry 424, which itself comprises access request snoop control circuitry 425 and a level two (L2) cache 426. The L2 circuitry 424, via a coherent interconnect interface (CHI), connects to the coherent interconnect 430 which in turn connects to the memory 420 and the disk 422. Other devices such as the peripheral 432 are also attached to the coherent interconnect 430. The apparatus 400 also comprises a DMA 434 which may perform various functions within the data processing apparatus, but in particular in the present context may access the LCU via an ACE slave port in order to populate the LLRAM 410 with data on start up or a reset.

At least one of the CPUs 401-404 is capable of operating in a virtual mapping mode and in a physical mapping mode. When the CPUs 401-404 access data items stored in memory 200 or in disk 422, these accesses are not subject to the particular constraints of the present techniques. However, when any of the CPUs 401-404 access the LLRAM 410, the above-described constraints with regard to checking for a correspondence between virtual address index portions of an address and physical address index portion are imposed. These constraints are, as in the example of FIG. 1, imposed by circuitry within a load/store unit within each CPU (not explicitly). Accordingly, when any of the CPUs 401-404 accesses the LLRAM 410, when the respective CPU is operating in a virtual mapping mode, a check is made to determine if the virtual address index portion is the same as the physical address index portion. When this is not true, then allocation of the accessed data item into the respective L1 cache of the CPU is prevented.

A write request issued by one of the CPUs 401-404 in which the virtual and physical address index bits differ is carried out as a non-allocating self-snooping request, in which the write data will be written out to the LLRAM 410 in parallel to sending an invalidating snoop (issued by the snoop control 415) back to the requester in the location in which the virtual and physical address index bits are the same. According to this approach the software operating in the VMSA (virtual memory mode) can access the LLRAM 410 from any legal virtual address mapping, but its L1 cache will only ever contain data for which the virtual and physical address index bits are the same, thus ensuring that when the CPU switches to its physical mapping mode (PMSA) software in this mode can execute without any dependency on evicting or updating aliased locations. Further, in one example embodiment of the system of FIG. 4 at least one of the CPUs 401-404 only uses its physical mapping mode to access the LLRAM 410, but uses its virtual mapping mode to access the memory 420 and disk 422. This configuration may be implemented where the LLRAM data is expected to be used in a real-time context and the other data storage in the system is expected to be accessed in a non-real-time context.

Figure 5:
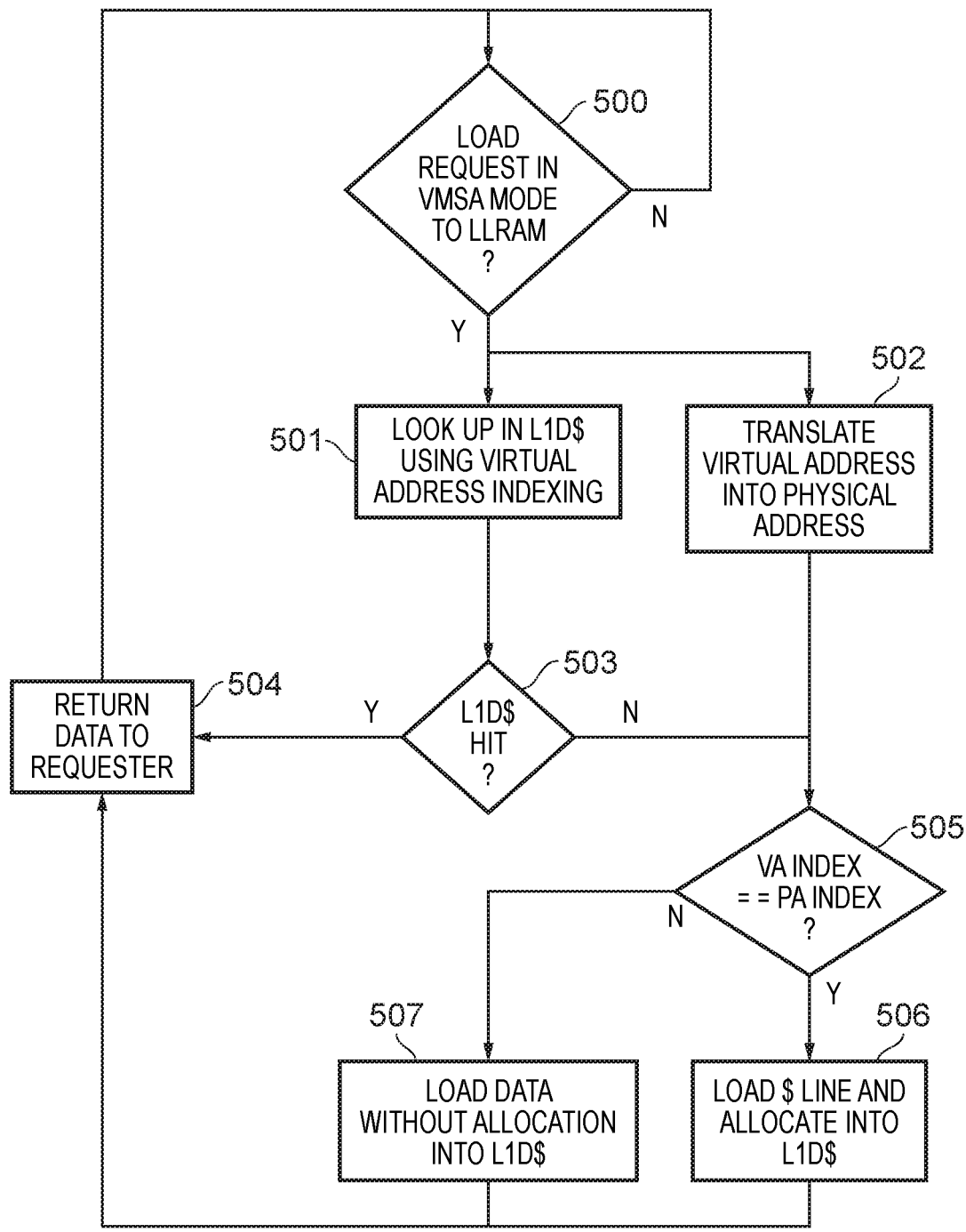
FIG. 5 is a flow diagram showing a sequence of steps which are taken according to the method of one example embodiment when a load request is received from a processing element operating in a virtual memory mapped mode and accessing a low latency data storage.

FIG. 5 is a flow diagram showing a sequence of steps which are taken according to the method of an example embodiment. FIG. 5 is concerned with the manner in which some load requests are handled. The flow can be considered to begin at step 500 where it is determined if a load request has been received in VMSA (virtual mapping) mode seeking to access a data item in the LLRAM (for example as illustrated in FIG. 4). Until this is true the flow waits at step 500. When such a load request is received then the flow divides and, in parallel, a speculative lookup in the L1 data cache is performed at step 501 using the virtual address indexing. At the same time, at step 502 the virtual address is translated into the corresponding physical address. If the lookup at step 501 results in a level one data cache hit, then at step 503 then the flow proceeds to step 504 where the requested data is returned to the requester and the flow returns to step 500. If however at step 503 there is a cache miss in the L1 data cache then, once the translation of the virtual address into the physical address has returned, at step 505 it is determined if the virtual address index portion is the same as the physical address index portion. If it is, then the flow proceeds to step 506 where the required cache line containing the requested data item is retrieved from memory and allocated into the L1 data cache. Alternatively, if it is determined at step 505 that the virtual and physical address index portions differ then the flow proceeds via step 507 at which the data item is loaded without allocating a cache line into the L1 data cache. The flow proceeds via step 504 for the data to be returned to the requester and from there back to step 500.

Figure 6:
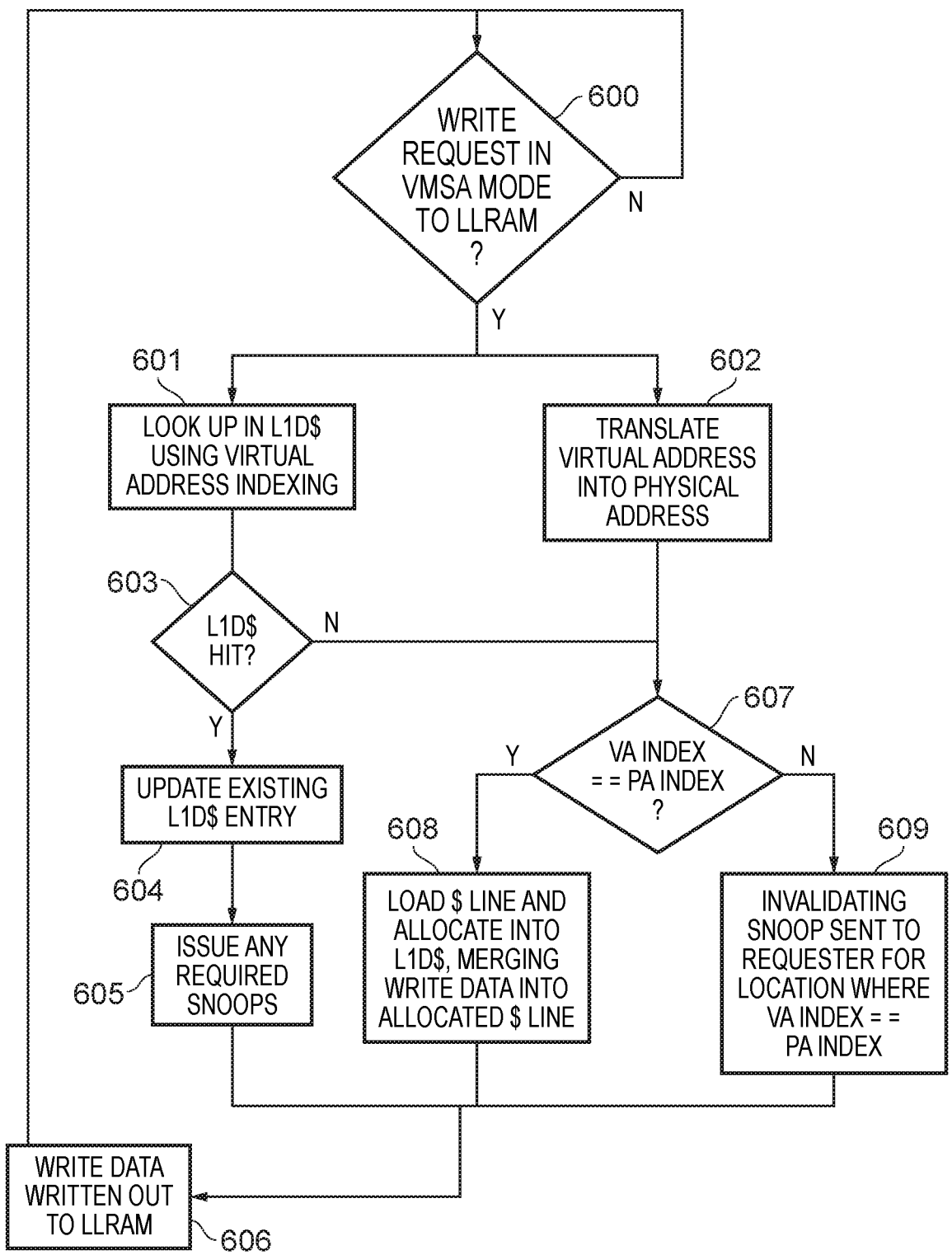
FIG. 6 is a flow diagram showing a sequence of steps which are taken according to the method of one example embodiment when a write request is received from a processing element operating in a virtual memory map mode when accessing a low latency data storage.

FIG. 6 is a flow diagram showing a sequence of steps which are taken in accordance with the method of one example embodiment, in particular relating to the handling of write requests targeting the LLRAM in the VMSA (virtual mapping) mode. The flow can be considered to begin at step 600 where it is determined if a write request has been received from a processing element operating in the VMSA mode, seeking access to a data item stored in the LLRAM. Until this is the case, the flow returns to step 600. When this is the case, then at step 601 a speculative lookup in the L1 data cache using the virtual address indexing is performed and in parallel at step 602 the virtual address is translated into the corresponding physical address. At step 603 it is determined if the speculative L1 data cache lookup has resulted in a hit or not. If it has then the existing L1 data cache entry is updated at step 604 and any required snoops are also issued at step 605. Finally, at step 606 the data is written out to the LLRAM and the flow returns to step 600. Returning to a consideration of step 603 if the lookup results in a cache miss then the flow proceeds to step 607 where, once the translation of the virtual address into the physical address from step 602 is available, it is determined if the virtual address index portion and the physical address index portion are the same. If they are, then at step 608 the required cache line comprising the data item is loaded and allocated into the L1 data cache, merging the write data into the allocated cache line. The modified data item is then finally written out to the LLRAM at step 606 and the flow returns to step 600. Alternatively, if at step 607 it is found that the virtual address index portion and the physical address index portion differ then at step 609 an invalidating snoop is sent to the requester for the location where the virtual address index portion and the physical address index portion are the same and then finally at step 606 the data item is written out to the LLRAM and the flow returns to step 600.

In brief overall summary apparatuses and methods of operating apparatus are disclosed. A processing element performs data processing operations with respect to data items stored in data storage. In a first mode the processing element references the data items using physical addresses and in a second mode the processing element references the data items using virtual addresses. A data access request handling unit receives data access requests issued by the processing element and cache stores cache lines of temporary copies of the data items retrieved from the data storage, wherein a cache line in which a data item is stored in the cache is selected in dependence on an address index portion. The data access request handling unit is responsive to a data access request for the data item from the processing element in the second mode to determine an index matching condition to be true when the address index portion of the physical address of the data item matches the address index portion of the virtual address of the data item and, when the index matching condition is false, to prevent allocation of the data item into the cache.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
   a processing element to perform data processing operations with respect to data items stored in data storage, wherein when in a first mode the processing element is arranged to reference the data items using physical addresses and when in a second mode the processing element is arranged to reference the data items using virtual addresses;
   a data access request handling unit to receive data access requests issued by the processing element; and
   a cache to store cache lines of temporary copies of the data items retrieved from the data storage, wherein a cache line in which a data item is stored in the cache is selected in dependence on an address index portion,
   and wherein the data access request handling unit is responsive to a data access request for the data item from the processing element in the second mode to determine an index matching condition to be true when the address index portion of the physical address of the data item matches the address index portion of the virtual address of the data item and, when the index matching condition is false, to prevent allocation of the data item into the cache.

2. The apparatus as claimed in claim 1, wherein the address index portion of the physical address of the data item differs from the address index portion of the virtual address of the data item by at most an address index sub-portion,
   and wherein the data access request handling unit is responsive to the data load request for the data item from the processing element in the second mode to determine the index matching condition to be true when the address index sub-portion of the physical address of the data item matches the address index sub-portion of the virtual address of the data item.

3. The apparatus as claimed in claim 1, wherein the data access request handling unit is responsive to the index matching condition being true, to cause allocation of the data item into the cache.

4. The apparatus as claimed in claim 1, wherein the data access request handling unit is responsive to the data load request for the data item from the processing element in the second mode to cause a speculative lookup in the cache using the virtual address index portion of the data item.

5. The apparatus as claimed in claim 4, wherein the data access request handling unit is responsive to the data load request for the data item from the processing element in the second mode to translate the virtual address of the data item into the physical address of the data item in parallel with the speculative lookup in the cache.

6. The apparatus as claimed in claim 1, wherein when the data access request is a data write request the data access request handling unit is responsive to the data write request for the data item from the processing element in the second mode to determine whether the index matching condition is true,
   and, when the index matching condition is false, to prevent allocation of the data item into the cache and to cause invalidation of a cache line identified by the address index portion of the physical address of the data item.

7. The apparatus as claimed in claim 1, wherein the data storage comprises a first data storage and a second data storage, and the processing element is arranged to access the data items in the first data storage using the first mode and to access the data items in the second data storage using the second mode.

8. The apparatus as claimed in claim 7, wherein the first data storage has a lower average access latency than the second data storage.

9. The apparatus as claimed in claim 8, wherein the data access request handling unit is responsive to the data access request with respect to the first data storage to treat the cache as a write-through cache and is responsive to the data access request with respect to the second data storage to treat the cache as a write-back cache.

10. The apparatus as claimed in claim 1, comprising multiple processing elements to perform the data processing operations with respect to the data items stored in the data storage,
    wherein the data access request handling unit is arranged to receive data access requests issued by each of the multiple processing elements.

11. The apparatus as claimed in claim 10, wherein the data access request handling unit is responsive to the data access request for the data item from the processing element in the second mode to issue coherency protocol commands with respect to the data item to each of the multiple processing elements.

12. The apparatus as claimed in claim 5, wherein the data access request handling unit is responsive to the data write request for the data item, when the index matching condition is true, to cause allocation of the data item into the cache.

13. The apparatus as claimed in claim 12, wherein the data access request handling unit is responsive to the data write request for the data item, when causing allocation of the data item into the cache, to forward a data read request for a cache line containing the data item to the data storage and, when the cache line is returned, to cause the data item to be merged into the returned cache line and to form an updated returned cache line and to cause allocation of the updated returned cache data item into the cache.

14. The apparatus as claimed in claim 1, wherein the processing element is arranged to operate in the first mode when performing data processing operations for a real-time context and to operate in the second mode when performing data processing operations for a non-real-time context.

15. A method of data processing comprising:

performing data processing operations with respect to data items stored in data storage, wherein in a first mode the performing data processing operations references the data items using physical addresses and in a second mode the performing data processing operations references the data items using virtual addresses;

receiving data access requests issued as part of performing data processing operations;

caching cache lines of temporary copies of the data items retrieved from the data storage, wherein a cache line in which a data item is stored in the cache is selected in dependence on an address index portion; and in response to a data access request for the data item from the performing data processing operations in the second mode:

determining an index matching condition to be true when the address index portion of the physical address of the data item matches the address index portion of the virtual address of the data item;

and, when the index matching condition is false, preventing allocation of the data item into the cache.

16. Apparatus comprising:

means for performing data processing operations with respect to data items stored in data storage, wherein when in a first mode the means for performing data processing operations is arranged to reference the data items using physical addresses and when in a second mode the means for performing data processing operations is arranged to reference the data items using virtual addresses;

means for receiving data access requests issued by the means for performing data processing operations;

means for caching cache lines of temporary copies of the data items retrieved from the data storage, wherein a cache line in which a data item is stored in the means for caching cache lines is selected in dependence on an address index portion; and means for determining, in response to a data access request for the data item from the means for performing data processing operations in the second mode, an index matching condition to be true when the address index portion of the physical address of the data item matches the address index portion of the virtual address of the data item; and means for preventing allocation of the data item into the cache when the index matching condition is false.

* * * * *